3,324,110
METHOD OF PHOSPHORYLATION AND NOVEL
INTERMEDIATES PRODUCED THEREBY
Alexander Nussbaum, Glen Ridge, N.J., assignor to
Schering Corporation, Bloomfield, N.J., a corporation
of New Jersey
No Drawing. Filed Oct. 27, 1966, Ser. No. 589,792
19 Claims. (Cl. 260—211.5)

This application is a continuation-in-part of the co-pending application Ser. No. 430,751 of Alexander Nussbaum filed Feb. 5, 1965, and now abandoned.

This invention relates to a novel process for preparing monoesters of phosphoric acid and to novel intermediates produced thereby.

The invention sought to be patented, in its composition aspect, is described as residing in the concept of a chemical compound having a molecular structure in which there is attached to the phosphorus atom in a phosphoryl radical, a hydroxyl group in the form of its pyridinium salt or the hereinafter disclosed equivalents thereof, a thioethyl group or its hereinafter disclosed equivalents, and an —OR group wherein R is a residue of an alcohol, ROH, having preferably up to thirty carbon atoms, said alcohol being devoid of additional free hydroxyl groups in either of positions alpha and beta to the phosphorylated hydroxyl group.

A tangible embodiment of the composition aspect of this invention is a pyridinium R-(S-ethyl)-phosphorothioate (i.e. an R ester of (S-ethyl)-phosphorothioic acid as the pyridinium salt) having the formula:

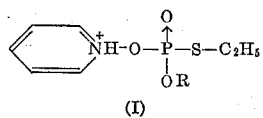

(I)

wherein R is as hereinabove defined.

Alcohols which will form the (S-ethyl)-phosphorothioate esters of the above formula are those wherein there are no unsubstituted hydroxyl groups α or β to the phosphorylated hydroxyl group and wherein the hydroxyl function to be phosphorylated is not unduly hindered. Thus, primary and secondary aliphatic and alicyclic alcohols and some tertiary aliphatic and alicyclic alcohols, e.g. 17a-ethinyltestosterone, will form (S-ethyl)-phosphorothioate diesters, as well as some aromatic alcohols, e.g. phenol.

Alcohols, ROH, which will form (S-alkyl)-phosphorothioates include alkanols such as methanol, ethanol, isopropanol, t-butylcarbinol, octanol, and the like; steroidal alcohols, e.g. desoxycorticosterone, 9α,11β-dichloro - 16α - methyl - 1,4-pregnadiene-17α,21-diol-3,20-dione 17-valerate and other alkanoate esters thereof such as the corresponding 17-cyclopentylpropionate and the corresponding 17-acetate, and homologs of the foregoing, such as the 6α-methyl homolog; and hydroxy compounds in the nucleoside field, e.g. 5-iodo-3-acetoxy-2-deoxyuridine, and 5-O-tritylthymidine. In steroids, primary and secondary hydroxyl groups at positions 1,2,3,4,6,7,12,15, 16,17 (when there is no side chain at C-17), 18,19, and 20, and 21, will form (S-ethyl)-phosphorothioate esters as will also such primary or secondary hydroxyl groups in an extended side chain.

The tangible embodiments of this invention are useful as chemical intermediates in the preparation of monoesters of phosphoric acid with the alcohol, ROH. As discussed hereinbelow, some of the R-(S-ethyl)-phosphorothioates also have valuable therapeutic properties as determined by standard pharmacological tests.

The invention sought to be patented in one of its process aspects, is described as residing in the concept of preparing a monoester of phosphoric acid with the alcohol, ROH, by subjecting a pyridinium R-(S-ethyl)-phosphorothioate or equivalent thereof, to oxidative hydrolysis at about pH 7 by means of molecular iodine, or alone in an aqueous, nonreactive, organic solvent such as acetone or dioxane.

In this application, by "aqueous solvent" is meant a solvent containing some water; and by "nonreactive solvent" is meant a solvent which does not possess an active hydrogen such as is present in lower alkanols (e.g. methanol and ethanol) and in solvents containing groups such as carboxyl, amino, thiol, hydroxyl and sulfonic acid.

A schematic presentation of this process is as follows:

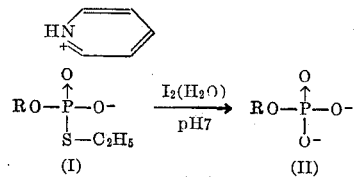

wherein R is as heretofore defined.

In general, in the above process, the iodine oxidatively hydrolyzes approximately a molar equivalent of R-(S-ethyl)-phosphorothioate intermediate (I). To obtain complete conversion of the R-(S-ethyl)-phosphorothioate (I) to the R-mono-ester of phosphoric acid (II), it is therefore necessary to use at least a molar equivalent of iodine (and preferably an excess thereof) with respect to the molar quantity of the R-(S-ethyl)-phosphorothioate intermediate.

When the cations are not specifically indicated as in formula II above, it is to be understood that the inferred cation is a pyridinium salt or an equivalent thereof as disclosed hereinbelow, or a proton.

The invention sought to be patented, in another of its process aspects, is described as residing in the concept of preparing a monoester of phosphoric acid with the alcohol (ROH) i.e.

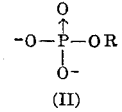

(II)

via the process comprising the steps of preparing a pyridinium R - (S - ethyl) - phosphorothioate (or equivalent thereof) and replacing the thioethyl group therein (or equivalent thereof) by an oxy cation via oxidative hydrolysis at about pH 7 utilizing molecular iodine.

The manner and process of making and using the invention will now be generally described so as to enable a person skilled in the art of chemistry to make and use the same. A preferred mode of carrying out my novel process is as follows:

In the two step process aspect of this invention, the starting compound, i.e. (S-ethyl)-phosphorothioic acid is preferentially used in the form of the di-lithium salt (although other alkali and alkaline earth salts may be used such as the di-sodium salt, the barium salt and the like). The di-lithium salt, in turn is converted to the di-pyridinium salt utilizing known techniques; for example, by passing a solution of di-lithium (S-ethyl)-phosphorothioate in a pyridine-water mixture over a sulfonic acid cation exchange resin (e.g. a Dowex exchange resin) in the pyridium phase. The di-pyridinium (S-ethyl)-phosphorothioate salt is then condensed with the alcohol (ROH), e.g. n-octanol in pyridine in the presence of dicyclohexylcarbodiimide, the molar quantity of the alcohol preferably being less than (and at most equal to) the molar quantity of the di-pyridinium salt of (S-ethyl)-phosphorothioic acid and the molar quantity of dicyclohexylcarbodiimide preferably being in excess to that of (S-ethyl)-phosphorothioate salt. In general, for each mole of alcohol (ROH) to be phosphorylated there is preferentially used about 3 moles of the di-pyridinium salt of (S-ethyl)-phosphorothioic acid and about 15 moles of dicyclohexylcarbodiimide. The condensation product so prepared is a novel R-(S-ethyl)-phosphorothioate (I) of this invention which, when n-octanol is the alcohol used, is pyridinium n-octyl-(S-ethyl)-phosphorothioate, i.e.

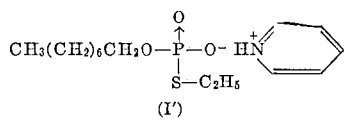

(I')

In the above described process for preparing the R-(S-ethyl)-phosphorothioate intermediate (exemplified by I' above) wherein the alcohol, ROH, is condensed with pyridinium (S-ethyl)-phosphorothioate (or an equivalent thereof), the alcohol nucleus, R, preferably does not contain a group more basic than pyridine, or a group containing a reactive hydrogen which will react with the condensing reagent (e.g. dicyclohexylcarbodiimide) used in the process defined hereinabove, exemplified by such as carboxyl, amino, thiol, hydroxyl, phosphoric acid and sulfonic acid groups.

In the above described process, the condensation reagent preferentially used is dicyclohexylcarbodiimide. There may also be used other condensing reagents which cause activation of the thiophosphate ion by forming a system with said thiophosphate ion in which positive phosphorus is produced by delocalization of an electron pair of the phosphorus atom in said thiophosphate ion. Examples of such condensing reagents are di-toluylcarbodiimide, Woodward reagent K (i.e. N-ethyl-5-phenylisoxazolium 3'-sulfonate), trichloroacetonitrile, and ethoxyacetylene.

The pyridinium (S-ethyl)-phosphorothioate intermediate, e.g. the pyridinium salt of n-octyl-(S-ethyl)-phosphorothioate, is oxidatively hydrolyzed by means of iodine in an aqueous, non-reactive solvent (preferably aqueous acetone) or by a solution of iodine in aqueous potassium iodide, according to the procedures described herein yielding the monoester of phosphoric acid, e.g. n-octyl-phosphate.

My novel compounds (exemplified by I' above) are preferentially prepared and utilized as intermediates in the form of their pyridinium salts. Other salts which may be used and which are considered as equivalents to the pyridinium salt are those of substituted pyridines, e.g. lutidine and collidine, or those of any cation derived from a base having a basicity approximately of the order of pyridine provided the cation will form a salt soluble in the condensing medium.

When a lutidine or collidine salt of my novel compounds (I) is prepared, the corresponding salt of S-(ethyl)-phosphorothioic acid is utilized as starting material and the corresponding methylated pyridine (lutidine or collidine) is preferentially used as condensing solvent, although other relatively polar, non-proton donor solvents such as dimethylformamide may also be used. This is consistent with the preferred mode of my process, as described in detail hereinabove, wherein pyridine is the solvent used when utilizing pyridinium (S-ethyl)-phosphorothioic acid as reagent, which upon reaction with an alcohol, ROH, e.g. octanol, forms a novel pyridinium diester (I) e.g. pyridinium n-octyl-(S-ethyl)-phosphorothioate.

When used as an intermediate in the oxidative hydrolysis step of my novel phosphorylation process, it is not necessary to purify the pyridinium (S-ethyl)-phosphorothioate ester, I. It is conveniently isolated by the addition of water to the reaction mixture and, after allowing the aqueous mixture to stand for a substantial period of time (usually 18–24 hours in order to destroy any metaphosphates) the reaction mixture is filtered, and the filtrate concentrated in vacuo to a residue comprising the (S-ethyl)-phosphorothioate ester pyridinium salt which may be used without further purification in the oxidative hydrolysis step with molecular iodine.

When isolated under essentially neutral conditions, as described above, my novel compounds, I, exist principally as the pyridinium salt of the anion.

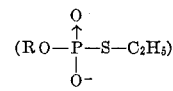

generally contaminated with some "free hydroxy" compound (i.e. having a proton instead of pyridinium cation). Depending on the mode of isolation and purification of compound, I, however, there also may be present a salt of the aforedescribed anion, the cation of which is obtained from a reagent more basic than pyridine used during isolation of the compound. In some cases the pyridinium cation may be replaced entirely by the more basic cation. For example, in preparing pyridinium 5-iodo-2'-deoxyuridine-3'-acetate-5'-(S-ethyl)-phosphorothioate, (III),

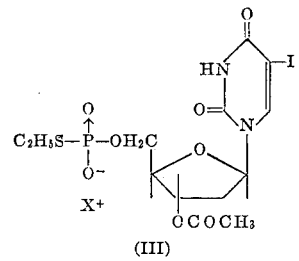

(III)

when isolation of III is effected by the addition of water followed by extraction with petroleum ether (as in Example 1A) in the isolated product, the cation X+ will be pyridinium contaminated by some product wherein X+ is a proton. When it is desired to further purify compound III by chromatographic techniques as described in Example 4 of this application wherein the (S-ethyl)-phosphorothioate is placed on a column of diethylaminoethylcellulose which is then irrigated with triethylammonium bicarbonate, the cation, X+, in the purified product is triethylammonium.

Cations X+ such as triethylammonium in compound III are also considered as equivalent to the pyridinium cation in my novel compounds since the exact nature of the cation (X+) is not critical for the oxidative hydrolysis step with iodine, since, upon treatment with iodine at pH7 in an aqueous, nonpolar solvent or in an aqueous potassium iodide solution, each possible component of the above-described compound, III, i.e., pyridinium 5-iodo-2'-deoxyuridine-3'-acetate-5'-(S-ethyl)-phosphorothioate, 5-iodo-2'-deoxyuridine-3'-acetate-5'-(S-ethyl)-phosphorothioic acid, and triethylammonium 5-iodo-2'-deoxyuridine-3'-acetate-5'-(S-ethyl)phosphorothioate are hydrolyzed to form 5' - iodo-2' - deoxyuridine-3'-acetate-5'-phosphate, i.e.

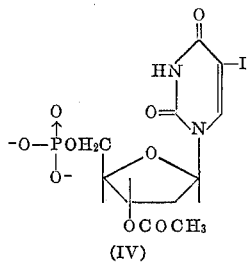

(IV)

In my novel process wherein a pyridinium (S-ethyl)-phosphorothioate is condensed with an alcohol, ROH, those alcohols having more than one reactive hydroxyl group will form poly-(S-ethyl)-phosphorothioate esters provided the two hydroxyl groups are not in a position alpha or beta to each other, in which event the formation of cyclic derivatives predominates over that of the (S-ethyl)-phosphorothioate esters. A mono-(S-ethyl)-phosphorothioate ester of a polyhydroxy compound (including those having two hydroxyl groups positioned alpha or beta to each other) may be prepared by the method described above provided there is first prepared protective derivatives of all free hydroxyl groups except the one to be phosphorylated. For example, as described in Examples 4 and 5 of this application, the preparation of the 5'-monophosphate of 5-iodouracil-2'-dexyriboside, the primary hydroxyl function at C–5' is first blocked by formation of the triphenylmethyl ether thereof by reaction with triphenylmethyl chloride in pyridine. Treatment of the 5'-iodouracil-2' - deoxyriboside-5' - triphenylmethyl ether thereby formed with acetic anhydride in pyridine, followed by acetic acid treatment, yields the acetate ester of the secondary hydroxyl group at C–3' (positioned beta to the 5'-hydroxy group) with concomitant hydrolysis of the ether function at C–5' to give 5-iodouracil-2'-deoxyriboside -3'-acetate. Reaction of this compound with pyridinium (S-ethyl)-phosphorothioic acid according to my process gives the corresponding 5 - (S-ethyl)-phosphorothioate, i.e. pyridinium 5-iodouracil-2'-deoxyriboside-3' - acetate - 5' - (S-ethyl)-phosphorothioate, which, upon treatment with iodine in aqueous acetone at about pH7 followed by hydrolysis of the 3' - acetate group, yields the desired 5 - iodouracil - 2' - deoxyriboside - 5 - phosphate possessing a free hydroxyl group at C–3' which is beta to the phosphate ester group at C–5'.

A preferred manner of carrying out the heretofore mentioned two-step process may be depicted according to the following reaction scheme:

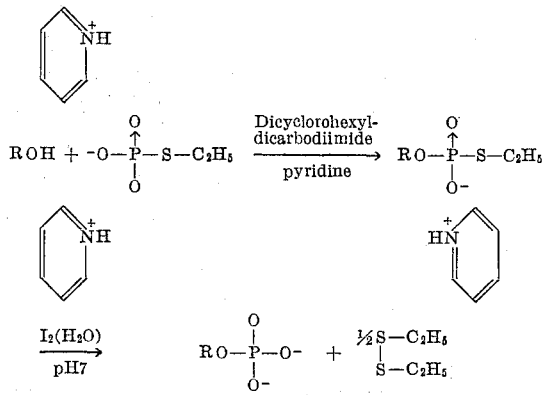

From the above, it is apparent the thioalkyl moiety (preferably S-ethyl) acts as a protecting or blocking group which can be easily hydrolyzed at pH7 after esterification of the (S-alky)-phosphorothioic acid with the alcohol (ROH) in anhydrous pyridine with dicyclohexylcarbodiimide. That an alkylthio moiety will function as a protecting group when reacting an (S-alky)-phosphorothioic acid with an alcohol (ROH) is surprising, for heretofore the use of the thioalkyl substituent as an activating group has been reported. Wieland et. al. and Lambert Chem. Ber. 89, 2476 (1956) have reported on the alcoholysis (i.e. treatment with a large excess of an alcohol ROH) of (S-alkyl)-phosphorothioic acids in the presence or absence of iodine to yield monoesters of phosphoric acid:

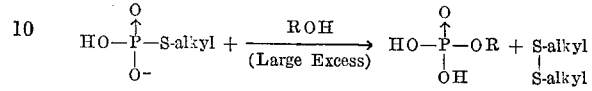

In this prior art process the thioalkyl group is actually replaced by the alcohol radical, whereas in the process of this invention the thioalkyl group withstands the esterification step. It is apparent that my novel process requires far lesser amounts of the alcohol (ROH) (indeed, preferentially less than that of (S-alkyl)-phosphorothioic acid reagent). This is extremely advantageous when it is desired to prepare the monophosphate ester of alcohols which are rare and difficult to make, such as alcohols of the steroidal art, e.g. $9\alpha,11\beta$ - dichloro - $16\beta$ - methyl-l,4-pregnadiene-$17\alpha$,21-diol-3,20-dione 17-valerate, or in the nucleoside series, e.g. 5-iodouracil-2'-deoxyriboside-3'-acetate.

My novel process proceeds in very good yields, which are much higher than yields obtained in processes, such as the aforementioned prior art process, in which there is not formed the intermediary R-(S-ethyl)-phosphorothioate (I), the compound aspect of this invention.

For example, the phosphorylation of 11-desoxycorticosterone without generation of said intermediate I yields at most 0.3% of 11-desoxycorticosterone. In my novel process, the phosphate monoester is obtained in 30% yield. Indeed, in preparing mono-steroidal phosphate esters, I have found the S-thioalkyl substituent completely unreactive under the conditions of my novel process as evidenced by the absence of di-steroid monophosphate which would exist were the thioalkyl group functioning at all as an activating group. In such a case, in addition to the esterification of the free steroid hydroxyl group at C–21 there would occur replacement of the thioalkyl moiety by the steroidal alcohol according to the following:

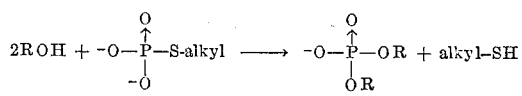

The above indicated formation of such diesters has never been observed under the conditions of my process.

My novel process is also advantageously used over other known phosphorylating processes which employ blocking group techniques, since, in my process the thioalkyl group can be hydrolyzed in neutral media. Heretofore, in phosphorylation processes employing blocking groups, removal of the blocking group could be accomplished only in strongly alkaline or acidic media. For example, a cyanoester group blocking a hydroxyl in a phosphate ester, is split off via $\beta$-elimination by means of akaline reagents. Conversely, a dimorpholidate blocking group requires acidic hydrolysis for removal. By this invention, therefore, phosphoric acid monoesters heretofore unattainable, are obtained. For example, $9\alpha,11\beta$-dichloro - $16\alpha$ - methyl - 1,4-pregnadiene - $17\alpha$,21 - diol-3,20-dione 17-valerate 21-phosphate, or its derived salts, valuable as a topical anti-inflammatory agent (prepared in the instant process by the action of aqueous iodine in acetone on pyridinium $9\alpha,11\beta$-dichloro-$16\alpha$-methyl-1,4-pregnadiene - $17\alpha$,21 - diol - 3,20 - dione 17 - valerate 21- [(S-ethyl)-phosphorothioate] could not be prepared via known "blocking agent" phosphorylation processes because the acidic or basic medium necessary for removal of the blocking group also hydrolyzes the 17-valerate group.

It is thus apparent the property of the (S-ethyl)-phosphorothioate diesters of this invention of being oxidatively hydrolyzed in a neutral medium is of great value in preparing phosphoric acid monoesters of hydroxylated compounds sensitive to both acid and base, particularly those in the nucleoside series (e.g. when ROH is 5'-iodo-3-acetoxy-2'-deoxyuridine) and those in the steroidal art (e.g. when ROH is 9α,11β-dichloro-16α-methyl-1,4-pregnadiene-17α,21-diol-3,20-dione 17-valerate).

The starting compound for the process of this invention, i.e. (S-ethyl)-phosphorothioic acid is a known compound and is prepared according to known procedures such as by direct phosphorylation of ethylthiol by a phosphorylating agent (e.g. phosphorus oxychloride) or, preferably, by reaction of a salt of phosphorothioic acid with an ethyl halide utilizing known methods. Other (S-alkyl)-phosphorothioic acids are known, e.g. (S-n-butyl)-phosphorothioic acid, and others are prepared by known techiques.

In the process of this invention, (S-alkyl)-phosphorothioic acids other than S-ethyl-phosphorothioic acid may be used as starting compounds and there will be produced phosphoric acid monoesters in good yield. For example, the barium salt of (S-n-butyl)-phosphorothioate, after conversion to the dipyridinium salt, is reacted with desoxycorticosterone in pyridine utilizing dicyclohexylcarbodiimide as the catalyst, whereby is obtained pyridinium desoxycorticosterone 2-(S-n-butyl)-phosphorothioate having the formula:

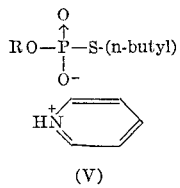

(V)

wherein R is

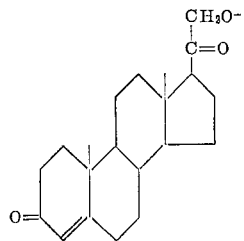

Treatment of V wits iodine in aqueous acetone as described herein yields the phosphoric acid monoester, desoxycorticosterone 21-phospate.

It is thus apparent from the foregoing that in the process aspect of this invention pyridinium S-(n-butyl-phosphorothioate (V) is utilizable in the same manner as pryridinium S-(ethyl)phosphorothioate, I (the compound aspect of this invention). In the specification and claims, R-(S-alkyl)-phosphorothioates wherein the alkyl group has up to 20 carbon atoms are considered equivalent to R-(S-ethyl)-phosphorothioates, the preferred intermediates being those wherein the alkyl group is a lower alkyl, i.e. having up to 4 carbon atoms including methyl, ethyl, n-propyl, iso-propyl, n-butyl, sec-butyl, and t-butyl. In view of the smaller size of the lower alkyl moiety, the pyridinium R-(S-lower alkyl)-phosphorothioates are more conveniently used in my novel process for preparing phosphoric acid monoesters than are their higher alkyl homologs.

The tangible embodiments of the composition aspect of this invention are valuable principally as intermediates in the novel process described herein which leads to the preparation of useful monoesters of phosphoric acid. Additionally, some compounds are physiologically active per se. Thus, pyridinium 5-iodo-2'-deoxyuridine-3'-acetate-5'-(S-ethyl)-phosphorothioate, (III), is active as an anti-viral agent as well as an intermediate in the preparatio of 5-iodo-2'-deoxyuridine-5'-phosphate, a known compound having anti-carcinogenic properties.

The best mode contemplated by the inventor of carrying out his invention will now be set forth as follows:

The following examples, the phosphate analyses are done by the method of P. S. Chen., T. Y. Toribara, and H. Warner, Analytical Chemistry, 28, 1756 (1956).

Weights are determined by optical density units. (A unit of optical density is defined as that quantity of material which, upon being dissolved in one milliliter of solvent will indicate on a spectrometer one unit of absorptance at the absorption maximum in a cell having a one centimeter optical path length.)

*Example 1.—n-Octylphosphate*

(A) *n-Octyl-(S-ethyl)-phosphorothioate.*—Percolate a solution of 92.4 mg. (0.0006 mole) of dilithium-(S-ethyl)-phosphorothioate in 100 ml. of pyridine in water (1:1) over 20 ml. of Dowex 50 x 8 cation exchange resin in the pyridinium phase packed in a glass column of 2 cm. diameter. Wash the resin with an additional 100 ml. of (1:1) pyridine in water. Concentrate the combinated eluates in vacuo to a residue comprising the di-pyridinium salt of (S-ethyl)-phosphorothioate. Dry this residue by adding 5 ml. of dried pyridine and again concentrating in vacuo to a residue. Repeat this procedure four times.

To the dry residue prepared above comprising the di-pyridinium salt of (S-ethyl)-phosphorothioate, add 27 mg. (0.0002 mole) of n-octyl alcohol and sufficient dry pyridine to provide a total volume of 1.5 ml., then add 600 mg. of di-cyclohexylcarbodiimide (0.0003 mole). Shake in a well-sealed vessel at room temperature for 48 hours, then add 2 ml. of water and allow the reaction mixture to stand at 0° C. for 18 hours.

Filter the resultant suspension and wash with water, then extract the combined filtrate and wash with water with petroleum ether. Concentrate the washed, aqueous layer to a residue comprising pyridinium n-octyl-(S-ethyl)-phosphorothioate, which is used without further purification in the procedure immediately following.

(B) *n-Octylphosphate.*—To a solution of the pyridinium n-octyl-(S-ethyl)-phosphorothioate prepared in Example 1A in 5 ml. of water, add a solution of 40 mg. of iodine and 80 mg. of potassium iodide in 10 ml. of water. Allow the reaction mixture to stand for 45 minutes, then acidify with hydrochloric acid to pH 2. Extract the acidified solution of n-octyl phosphate. Assay by high voltage electrophoresis and phosphorus analysis by phosphomolybdate colorimetry against a known standard indicates a yield of n-octyl phosphate of 63 percent.

*Example 2.—4-pregnen-21-ol-3,20-dione 21-phosphate*

(A) *Pyridinium 4-pregnen-21-ol-3,20-dione 21-[(S-ethyl)-phosphorothioate].*—In a manner similar to that described in Example 1A, allow 66 mg. (0.0002 mole) of 4-pregnen-21-ol-3,20-diol to react with the di-pyridinium salt of (S-ethyl)-phosphorothioate (prepared from 92.4 mg. (0.0006 mole of di-lithium-(S-ethyl)-phosphorothioate in pyridine/water) in the presence of 600 mg. of di-cyclohexylcarbodiimide (0.003 mole). Isolate the resultant product in a manner similar to that described in Example 1A, to obtain a residue comprising pyridinium 4-pregnen-21-ol-3,20-dione 21-[(S-ethyl) - phosphorothioate] (used without further purification in the procedure immediately following).

(B) *4-pregnen-21-ol-3,20-dione 21-phosphate.* — Dissolve the pyridinium 4-pregnen-21-ol-3,20-dione 21-[(S-ethyl)-phosphorothioate] (prepared in Example 2A) in 10 ml. of acetone. Add 15 ml. of a solution containing 40 mg. of iodine and 80 mg. of potassium iodide per 10 ml. of water. Allow the reaction mixture to stand one and one-half hours, acidify the reaction mixture with hydrochloric acid to pH2 and extract with isoamyl alcohol.

Concentrate the combined extracts to a residue comprising 4-pregnen-21-ol-3,20-dione 21-phosphate.

Purify by dissolving the residue comprising 4-pregnen-21-ol-3,20-dione 21-phosphate in water (pH 7.5) and pouring the water solution onto a column (1 x 10 cm.) of diethylaminoethyl cellulose in bicarbonate cycle. Institute gradient elution (one liter of 0.1 mole triethylammonium bicarbonate (pH 7.5) into a mixing vessel containing one liter of water), collecting 15 ml. fractions. Combine those fractions eluted with 0.04 molar buffer solution. Concentrate to a residue and lyophilize, yielding (30%) purified 4-pregnen-21-ol-3,20-dione 21-acetate as the triethylammonium salt, UV maximum in water at 248 m$\mu$.

*Analysis.*—1.05$\mu$ M.P./14 O.D. units at 248 m$\mu$ (requires 1.00).

*Example 3.—Attempted preparation of 4-pregnen-21-ol-3, 20-dione without the intermediate pyridinium 4-pregnen-21-ol-3,20-dione 21-[(S-ethyl)-phosphorothioate]*

Allow 66 mg. (0.0002 mole) of 4-pregnen-21-ol-3,20-diol to react with 92.4 mg. (0.0006 mole) of di-pyridinium (S-ethyl)-phosphorothioate in one ml. pyridine in the presence of 212.4 mg. (0.0006 mole) of iodine. Shake in a well-sealed vessel at room temperature for 48 hours. Concentrate to dryness at room temperature in vacuo to a residue. Purify in the manner described in Example 2B, i.e. elute the residue from a diethylaminoethyl cellulose column with triethylammonium bicarbonate.

An ultraviolet scan of the eluated fractions did not indicate the presence of 4-pregnen-21-ol-3,20-dione 21-phosphate.

*Example 4.—5-iodouracil 2'-deoxyriboside-3-acetate-5'-(S-ethyl)-phosphorothioate*

(A) *5-iodouracil 2' - deoxyriboside-5'-triphenylmethyl ether.*—To a solution of 354 mg. (0.001 mole) of 5-iodouracil-2-deoxyriboside dissolved in 5 ml. of dry pyridine, add 45 mg. of chlorotriphenylmethane. Protect the solution from moisture, then heat the solution at 100° C. for 45 minutes. Cool, then add the solution dropwise to ice water and extract the aqueous mixture with ethyl acetate. Concentrate the combined ethyl acetate extracts to a residue comprising 5-iodouracil-2'-deoxyriboside-3'-aceate-5'-triphenylmethyl ether. Purify by crystallization from acetone/benzene, M.P.=132–145° C. yield=400 mg. (homogeneous in thin layer chromatography) R$_f$=0.5 on silica gel ethyl acetate:chloroform (2 to 1).

(B) *5-iodouracil-2'-deoxyriboside-3'-acetate.* — To a solution of 380 mg. of 5-triphenylmethyl ether prepared in Example 4A in 1 ml. of dry pyridine, add 1 ml. of acetic anhydride. Allow the solution to stand for 20 hours at 37° C., then concentrate the solution in vacuo to a residue comprising 5-iodouracil-2'-deoxyriboside-3'-acetate-5'-triphenylmethyl ether.

Dissolve the 3'-acetate 5'-triphenylmethyl ether prepared as described in the above paragraph in 3 ml. of 80 percent aqueous acetic acid. Warm the solution at 100° C. for two and one-half hours, then cool. Dilute the solution with ice water and remove by filtration the resultant precipitate comprising triphenyl carbinol. Discard. Concentrate the aqueous filtrate to a residue, then add water to the residue and again concentrate to a residue comprising 5 - iodouracil-2'-deoxyriboside 3' - acetate. Purify by crystallization from acetone-isopropyl ether to 128 mg. of 3'-acetate. M.P.=196–198° C. (The material travels as a single spot in thin layer chromatography, R$_f$=0.3 on silica gel ethyl acetate: chloroform (2 to 1).

(C) *Pyridinium 5 - iodouracil-2'-deoxyriboside-3'-acetate-5'-(S-ethyl)-phosphorothioate.*—In a manner similar to that described in Example 1A, allow 39.8 mg. (0.0001 mole) of 5-iodouracil-2-deoxyriboside-3-acetate to react with the di-pyridinium salt of (S-ethyl)-phosphorothioate in pyridine. In a similar manner to that described in Example 1A, isolate the resultant product comprising pyridinium-5' - iodouracil-2'-deoxyriboside-3' - acetate-5'-(S-ethyl)-phosphorothioate, which may be used without further purification as an intermediate in the procedures of Examples 5 and 6.

If desired, purification is effected by dissolving the isolated product in 15 ml. of water followed by adjustment of pH to 8.0 with ammonia. Add this solution to an 18 x 2 cm. column of diethylaminoethyl cellulose. Wash the column with 300 ml. of distilled water, then irrigate with a gradient of one liter of 0.05 mole of triethylammonium bicarbonate (pH=7.5) into one liter of distilled water. Combine and lyophilize the like, early fractions yielding 5-iodouracil-2'-deoxyriboside-3'-acetate-5'-(S-ethyl)-phosphorothioate as the triethylammonium salt having 3950 optical density units at 278 m$\mu$ (68% yield).

*Example 5.—5-iodouracil-2'-deoxyriboside-3'-acetate-5'-phosphate*

Dissolve an aliquot of 1000 optical density units of pyridinium 5-iodouracil-2'-deoxyriboside-3'-acetate-5'-(S-ethyl)-phosphorothioate (prepared as described in Example 4B) in 20 ml. of a solution of 167 mg. of iodine in 50 percent aqueous acetone. Allow the solution to stand at room temperature for 45 minutes, then concentrate in vacuo to a residue comprising pyridinium 5-iodouracil-2'-deoxyriboside-3'-acetate-5'-phosphate.

Purify by subjecting the residue to ion exchange chromatography on a column of diethylaminoethyl cellulose eluted with a gradient of 0.1 mole of triammonium bicarbonate into one liter of distilled water. Combine the eluates at buffer strength 0.3 molar (720 optical density units=35% yield), then concentrate the combined eluates in vacuo to a residue comprising 5-iodouracil-2'-deoxyriboside-3'-acetate-5'-phosphate as the triethylammonium salt.

*Example 6.—5-iodouracil-2'-deoxyriboside-5'-phosphate*

Dissolve 5-iodouracil - 2' - deoxyriboside-3'-acetate-5'-phosphate (prepared as described in Example 5) in ammonium hydroxide. Allow the solution to stand overnight at room temperature, then evaporate in vacuo to a residue comprising 5 - iodouracil-2' - deoxyriboside-5'-phosphate.

*Example 7.—9$\alpha$,11$\beta$-dichloro-16$\alpha$-methyl-1,4-pregnadiene-17$\alpha$,21-diol-3,20-dione 17-valerate 21-phosphate*

(A) *Pyridinium 9$\alpha$,11$\beta$-dichloro-16$\alpha$-methyl-1,4-pregnadiene-17$\alpha$,21-diol-3,20-dione 17-valerate 21-[(S-ethyl)-phosphorothioate].*—In a manner similar to that described in Example 1A, treat 51.2 mg. (0.0001 mole) of 16$\alpha$-methyl - 9$\alpha$,11$\beta$ - dichloro-1,4-pregnadiene-17$\alpha$,21-diol-3, 20-dione 17-valerate with the di-pyridinium salt of (S-ethyl)-phosphorothioate in pyridine. In the described manner, isolate the resultant product comprising pyridinium 9$\alpha$,11$\beta$-dichloro - 16$\alpha$ - methyl - 1,4-pregnadiene-17$\alpha$,21-diol - 3,20 - dione 17 - valerate 21 - [(S-ethyl)-phosphorothioate].

(B) *9$\alpha$,11$\beta$ - dichloro - 16$\alpha$ - methyl - 1,4-pregnadiene-17$\alpha$,21 - diol - 3,20 - dione 17-valerate 21-phosphate.*—In a manner similar to that described in Example 2B, treat the pyridinium 9$\alpha$,11$\beta$ - dichloro-16$\alpha$ - methyl-1,4-pregnadiene-17$\alpha$,21-diol-3,20-dione 17-valerate 21-[(S-ethyl)-phosphorothioate] prepared in Example 7A with iodine in acetone, then isolate the resultant product by acidification with hydrochloric acid followed by extraction with isoamyl alcohol to give 9$\alpha$,11$\beta$ - dichloro-16$\alpha$-methyl-1,4-pregnadiene - 17$\alpha$,21 - diol-3,20 - dione 17 - valerate 21-phosphate.

Purify by placing the reaction solution onto a 10 x 1 cm. column of diethylaminoethyl cellulose followed by elution by a gradient of 1 liter of 0.1 mole of triethylammonium acetate (pH 6.9) into one liter of distilled water. Combine those eluates having buffer strength of 0.055 mole. Concentrate the combined eluates in vacuo followed by lyophilization to a residue comprising 9$\alpha$,11$\beta$-dichloro-16$\alpha$ - methyl-1,4-pregnadiene-17$\alpha$,21-diol - 3,20-dione 17-valerate 21-phosphate as the triethylammonium salt (single spot in high voltage electrophoresis=migration x 15 cm. toward the anode 25 V/cm., one hour in 0.05 molar ammonium acetate, pH 7.3) I.R. absorption of 5.74 m$\mu$.

*Example 8.—9$\alpha$,11$\beta$ - dichloro - 16$\alpha$ - methyl - 1,4 - pregnadiene - 17$\alpha$, 21 - diol - 3,20 - dione - 17 - acetate 21-phophate*

In a manner similar to that described in Example 7, treat 9$\alpha$,11$\beta$-dichloro-16$\alpha$-methyl-1,4-pregnadiene-17$\alpha$,21-diol-3,20-dione 17-acetate with di-pyridinium (S-ethyl)-phosphorothioate in pyridine followed by treatment of the thereby formed pyridinium 9$\alpha$,11$\beta$-dichloro-16$\alpha$-methyl-1,4-pregnadiene-17$\alpha$,21-diol-3,20-dione 17-acetate 21-[(S-ethyl)-phosphorothioate] with iodine in acetone whereby is obtained 9$\alpha$,11$\beta$-dichloro-16$\alpha$-methyl-1,4-pregnadiene-17$\alpha$,21-diol-3,20-dione 17-acetate 21-phosphate.

Purify in the manner described in Example 7B for the corresponding 17-valerate ester whereby is obtained 9$\alpha$,11$\beta$ - dichloro - 16$\alpha$ - methyl-1,4-pregnadiene-17$\alpha$,21-diol-3,20-dione 17-acetate 21-phosphate as the triethylammonium salt. This material travels as a single spot in paper chromatography (n-butanol: Methanol: Water in the volume ratio of 6:1:3) R=0.58. It had an ultraviolet absorption maximum at 242 m$\mu$ $\epsilon/P=14,500$.

The foregoing examples pertaining to the manufacture of monoesters of phosphoric acid are presented by way of illustration only. It is obvious that by replacing the foregoing alcohols with other alcohols, such as the 6$\alpha$,16$\alpha$-dimethyl - 9$\alpha$,11$\beta$ - dichloro - 1,4 - pregnadiene - 17$\alpha$,21-diol-3,20-dione 17 valerate and 6$\alpha$,16$\alpha$-dimethyl-9$\alpha$,11$\beta$-dichloro-1,4-pregnadiene-17$\alpha$,21-diol-3,20-dione 17-cyclopropionate, the corresponding 21-phosphate monoesters are similarly prepared, i.e. the 6$\alpha$,16$\alpha$-dimethyl-9$\alpha$,11$\beta$-dichloro-1,4-pregnadiene-17$\alpha$,21-diol-3,20-dione 17 - valerate 21-phosphate and the 6$\alpha$,16$\alpha$-dimethyl-9$\alpha$,11$\beta$-dichloro-1,4-pregnadiene-17$\alpha$,21-diol-3,20-dione 17-cyclopentylpropionate 21-phosphate, respectively.

I claim:

1. The process for the preparation of a mono-ester of phosphoric acid with the alcohol, ROH, said alcohol selected from the group consisting of primary and secondary alcohols devoid of free hydroxyl groups in either of positions alpha and beta to the OH moiety, the R moiety having up to thirty carbon atoms; which comprises:

reacting said alcohol with di-pyridinium (S-lower alkyl)-phosphorothioate in pyridine in the presence of dicyclohexylcarbodiimide;

and reacting the thereby formed pyridinium R-(S-lower alkyl)-phosphorothioate with molecular iodine in a substantially neutral, nonreactive, aqueous solvent.

2. The process according to claim 1 wherein said di-pyridinium (S-lower alkyl)-phosphorothioate is di-pyridinium (S-ethyl)-phosphorothioate and wherein to each mole of di-pyridinium (S-ethyl)-phosphorothioate there is present more than a mole of dicyclohexylcarbodiimide and at most a mole of said alcohol, ROH; and wherein the molar quantity of iodine is at least equal to that of the pyridinium R-(S-ethyl)-phosphorothioate thereby formed, said process comprising:

reacting said alcohol, ROH, with di-pyridinium (S-ethyl)-phosphorothioate in pyridine in the presence of dicyclohexylcarbodiimide, to each mole of di-pyridinium (S-ethyl)-phosphorothioate there being present more than a mole of dicyclohexylcarbodiimide and at most a mole of said alcohol, ROH;

and reacting the thereby formed pyridinium R-(S-ethyl)-phosphorothioate with molecular iodine in a substantially neutral, nonreactive, aqueous solvent, the molar quantity of iodine being at least equal to that of the pyridinium R-(S-ethyl)-phosphorthiate.

3. The process according to claim 2 wherein the aqueous solvent is aqueous acetone.

4. The process according to claim 1 wherein said alcohol, ROH, is 5-iodouracil-2'-deoxyriboside-3'-acetate, and said di-pyridinium (S-lower alkyl)-phosphorothioate is di-pyridinium (S-ethyl)-phosphorothioate, in said process in the preparation of 5-iodouracil-2'-deoxyriboside-3'-acetate-5'-phosphate, the steps which comprise:

reacting di-pyridinium (S-ethyl)-phosphorothioate with 5-iodouracil-2'-deoxyriboside-3'-acetate in pyridine in the presence of dicyclohexylcarbodiimide;

and reacting the thereby formed pyridinium 5-iodouracil - 2' - deoxyriboside - 3'-acetate-5'-(S-ethyl)-phosphorothioate with iodine in aqueous acetone.

5. The process according to claim 1 wherein said alcohol, ROH, is 9$\alpha$,11$\beta$-dichloro-16$\alpha$-methyl-1,4-pregnadiene-17$\alpha$,21-diol-3,20-dione 17-lower alkanoate and said di-pyridinium (S-lower alkyl)-phosphorothiate is di-pyridinium (S-ethyl)-phosphorothioate, in said process in the preparation of 9$\alpha$,11$\beta$-dichloro-16$\alpha$ - methyl-1,4-pregnadiene-17$\alpha$,21-diol-3,20-dione 17-lower alkanoate 21-phosphate, the steps which comprise:

reacting 9$\alpha$,11$\beta$ - dichloro-16$\alpha$-methyl-1,4-pregnadiene-17$\alpha$,21-diol-3,20-dione 17 lower alkanoate with di-pyridinium (S-ethyl)-phosphorothioate in pyridine in the presence of dicyclohexylcarbodiimide;

and reacting the thereby formed pyridinium 9$\alpha$,11$\beta$-dichloro-16$\alpha$,-methyl-1,4-pregnadiene-17$\alpha$,21-diol-3,20-dione 17-lower alkanoate 21-(S-ethyl)-phosphorothioate with iodine in aqueous acetone.

6. The process according to claim 1 wherein said alcohol, ROH, is 9$\alpha$,11$\beta$-dichloro-16$\alpha$-methyl-1,4-pregnadiene-17$\alpha$,21-diol-3,20-dione 17-valerate and said di-pyridinium (S-lower alkyl)-phosphorothioate is di-pyridinium (S-ethyl)-phosphorothioate, in said process in the preparation of 9$\alpha$,11$\beta$-dichloro-16$\alpha$-methyl-1,4-pregnadiene-17$\alpha$,21-diol-3,20 - dione 17-valerate 21-phosphate, the steps which comprise:

reacting 9$\alpha$,11$\beta$-dichloro-16$\alpha$-methyl-1,4-pregnadiene-17$\alpha$,21-diol-3,20-dione 17-valerate with di-pyridinium (S-ethyl)-phosphorothioate in pyridine in the presence of dicyclohexylcarbodiimide;

and reacting the thereby formed pyridinium 9$\alpha$,11$\beta$-dichloro-16$\alpha$-methyl-1,4-pregnadiene-17$\alpha$,21-diol - 3,20-dione 17-valerate 21-(S-ethyl)-phosphorothioate with iodine in aqueous acetone.

7. In the process for the preparation of a mono-ester of phosphoric acid with the alcohol, ROH, said alcohol selected from the group consisting of primary and secondary alcohols devoid of free hydroxyl groups in either of positions alpha and beta to the OH moiety, the R moiety having up to thirty carbon atoms, the step comprising:

reacting pyridinium R-(S-lower alkyl)-phosphorothioate with molecular iodine in a substantially neutral, nonreactive, aqueous solvent.

8. The process according to claim 7 wherein the pyridinium R-(S-lower alkyl)-phosphorothioate is pyridinium R-(S-ethyl)-phosphorothioate and wherein the quantity of molecular iodine is at least equivalent to that of said pyridinium R-(S-ethyl)-phosphorothioate, said process comprising:

reacting pyridinium R-(S-ethyl)-phosphorothioate with at least a molar equivalent of molecular iodine in a substantially neutral, nonreactive, aqueous solvent.

9. The process according to claim 8 wherein the aqueous solvent is aqueous acetone, said process comprising:

reacting pyridinium R-(S-ethyl)-phosphorothioate with at least a molar equivalent of molecular iodine in aqueous acetone.

10. The process according to claim 9 wherein said pyridinium R-(S-ethyl)-phosphorothioate is pyridinium 5-iodouracil-2'-deoxyriboside-3'-acetate-5'-(S-ethyl) - phosphorothioate, in said process in the preparation of 5-iodouracil-2'-deoxyriboside-3'-acetate-5'-phosphate, the step which comprises reacting pyridinium 5-iodouracil-2'-deoxyriboside - 3' - acetate-5'-(S-ethyl)-phosphorothioate with molecular iodine in aqueous acetone.

11. The process according to claim 9 wherein the pyridinium R-(S-ethyl)-phosphorothioate is pyridinium 9α,11β-dichloro - 16α - methyl-1,4-pregnadiene-17α,21-diol-3,20-dione 17-lower alkanoate 21-[(S-ethyl)-phosphorothioate], in said process in the preparation of 9α,11β-dichloro-16α-methyl-1,4-pregnadiene-17α,21diol-3,20 - dione 17-lower alkanoate 21-phosphate, the step comprising reacting pyridinium 9α,11β-dichloro-16α-methyl-1,4-pregnadiene-17α,21-diol-3,20-dione 17-lower alkanoate 21-[(S-ethyl)-phosphorothioate] with iodine in aqueous acetone.

12. The process according to claim 9 wherein said pyridinium R-(S-ethyl)-phosphorothioate is pyridinium 9α,11β-dichloro-16α-methyl-1,4 - pregnadiene - 17α,21-diol-3,20-dione 17-valerate 21-[(S-ethyl)-phosphorothioate], in said process in the preparation of 9α,11β-dichloro-16α-methyl-1,4-pregnadiene - 17α,21 - diol-3,20-dione 17-valerate 21-phosphate, the step comprising reacting pyridinium 9α,11β-dichloro-16α-methyl-1,4-pregnadiene-17α,21-diol-3,20-dione 17-valerate 21-[(S-ethyl)-phosphorothioate] with iodine in aqueous acetone.

13. Pyridinium R-(S-lower alkyl)-phosphorothioate wherein R is the residue of the alcohol, ROH, having up to thirty carbon atoms, said alcohol selected from the group consisting of primary and secondary alcohols devoid of additional free hydroxyl groups in either of positions alpha and beta to the OH moiety.

14. The compound according to claim 13 wherein R is n-octyl and wherein said lower alkyl is ethyl, said compound being pyridinium n-octyl-(S-ethyl)-phosphorothioate.

15. The compound according to claim 13 wherein R- is 4-pregnen-21-ol-3,20-dione 21- and wherein said lower alkyl is ethyl, said compound being pyridinium 4-pregnen-21-ol-3,20-dione 21-[(S-ethyl)-phosphorothioate].

16. The compound according to claim 13 wherein R- is 4-pregnen-21-ol-3,30-dione 21- and said lower alkyl is n-butyl, said compound being pyridinium 4-pregnen-21-ol-3,20-dione 21-[(S-n-butyl)-phosphorothioate].

17. The compound according to claim 13 wherein R- is 5-iodouracil-2'-deoxyriboside-3'-acetate-5'-, said compound being pyridinium 5-iodouracil-2'-deoxyriboside-3'-acetate-5'-(S-ethyl)-phosphorothioate.

18. The compound according to claim 13 wherein R- is 9α,11β - dichloro-16α-methyl-1,4-pregnadiene-17α,21-diol-3,20-dione 17-valerate 21- and said lower alkyl is ethyl, said compound being pyridinium 9α,11β-dichloro-16α - methyl-1,4-pregnadiene-17α,21-diol-3,20-dione 17-valerate 21-[(S-ethyl)-phosphorothioate].

19. The compound according to claim 13 wherein R- is 9α,11β - dichloro-16α-methyl-1,4-pregnadiene-17α,21-diol-3,20-dione 17-acetate 21- and said lower alkyl is ethyl, said compound being pyridinium 9α,11β-dichloro-16α-methyl-1,4-pregnadiene-17α,21-diol-3,20 - dione 17-acetate 21-[(S-ethyl)-phosphorothioate].

No references cited.

LEWIS GOTTS, *Primary Examiner.*

J. R. BROWN, *Assistant Examiner.*